United States Patent [19]

Ikeda et al.

[11] Patent Number: 4,634,292
[45] Date of Patent: Jan. 6, 1987

[54] ELECTRONIC THERMOMETER

[75] Inventors: Toshio Ikeda, Kameoka; Tamaki Sakamoto, Otokuni; Yoshihisa Masuo, Shiga, all of Japan

[73] Assignee: Omron Tateisi Electronics Co., Kyoto, Japan

[21] Appl. No.: 774,495

[22] Filed: Sep. 10, 1985

[30] Foreign Application Priority Data

Sep. 11, 1984 [JP] Japan .................... 59-136722[U]

[51] Int. Cl.<sup>4</sup> .................. G01K 3/14; G01K 13/00
[52] U.S. Cl. ............................. 374/109; 364/557; 374/167
[58] Field of Search ............ 374/109, 166, 110, 112, 374/167; 364/557

[56] References Cited

U.S. PATENT DOCUMENTS

| 3,898,884 | 8/1975 | Hopkins et al. | 374/206 X |
| 4,286,465 | 9/1981 | Thomae | 364/557 X |
| 4,377,948 | 3/1983 | Tenny, Jr. | 364/557 X |
| 4,403,296 | 9/1983 | Prosky | 374/109 X |
| 4,433,923 | 2/1984 | Rascati et al. | 374/112 |

Primary Examiner—Daniel M. Yasich
Attorney, Agent, or Firm—Wegner & Bretschneider

[57] ABSTRACT

An electronic thermometer apparatus includes an indoor temperature sensor, an outdoor temperature sensor, a single display unit capable of displaying exchangeably and alternately the indoor and the outdoor temperatures, means for automatically displaying alternately the indoor and outdoor temperature in a normal mode, means responding to the closing of a change-over switch in the course of the alternate display to thereby display the temperature other than that displayed immediately before the closing of said switch continuously until the switch is again opened, and means for allowing the alternate display of the indoor and outdoor temperatures to be effected automatically in response to the opening of the change-over switch.

3 Claims, 4 Drawing Figures

ELECTRONIC THERMOMETER

BACKGROUND OF THE INVENTION

1. Field of the Invention

The present invention relates to an electronic thermometer apparatus which is capable of displaying exchangeably indoor or outdoor temperature on a single display device.

2. Description of the Prior Art

In hitherto known electronic thermometer apparatus of the type mentioned above, changing-over or switching of the display from the indoor temperature display mode to the outdoor temperature display mode requires one switching operation, while changing-over from the latter to the former mode requires another switching operation. Further, for displaying both the indoor and outdoor temperature simultaneously, still another switching operation is necessary. Consequently, a relatively large number of parts for realizing these different switching operations are required, making the thermometer apparatus expensive to a disadvantage, aside from troublesome manipulation of the switches.

SUMMARY OF THE INVENTION

It is an object of the present invention to provide an electronic thermometer apparatus which normally displays alternately first and second temperatus in an automatic manner and in which upon turning-on of a change-over switch the temperature differing from the one displayed immediately before the turning-on of the switch is continuously displayed untill the switch is again turned off, whereupon the alternative display of the first and second temperatures is regained automatically.

Another object of the present invention is to provide an electronic thermometer apparatus of the kind mentioned above which is inexpensive and easy to manipulate by alleviating the troublesome procedures accompanying the change-over operation of the prior art thermometer apparatus.

In view of the above objects, there is provided according to an aspect of the present invention an improved electronic thermometer apparatus comprises an indoor temperature sensor, an outdoor temperature sensor, a single display unit capable of displaying exchangeably and alternately the indoor and the outdoor temperatures, means for automatically displaying alternately the indoor and outdoor temperatures in a mormal mode, means responding to the closing of a change-over switch in the course of the alternate display to thereby display the temperature other than that displayed immediately before the closing of said switch continuously until the switch is again opened, and means for allowing the alternative display of the indoor and outdoor temperatures to be effected automatically in response to the opening of the change-over switch.

With the electronic thermometer apparatus of the composition described above, it is possible to change over the display from the first temperature (e.g. indoor temperature) display mode to the second temperature (e.g. outdoor temperature) display mode or vice versa through a single switch manipulation, whereby the troublesome switch manipulation of the prior art thermometer apparatus described hereinbefore can be mitigated. Besides, the electronic thermometer apparatus according to the invention can respond to the closing of the change-over switch to display the temperature other than that displayed immediately before the closing of the switch. By virtue of this feature, the desired temperature can be rapidly read. Additionally, since the thermometer apparatus according to the invention can be implemented in a simplified structure, requiring the only one change-over switch, the apparatus can be manufactured at low costs.

The above and other objects, features and advantages of the invention will be more apparent from the following description of the preferred embodiments of the invention. The description makes reference to the drawings.

DESCRIPTION OF THE PREFERRED EMBODIMENT

Figure 1:
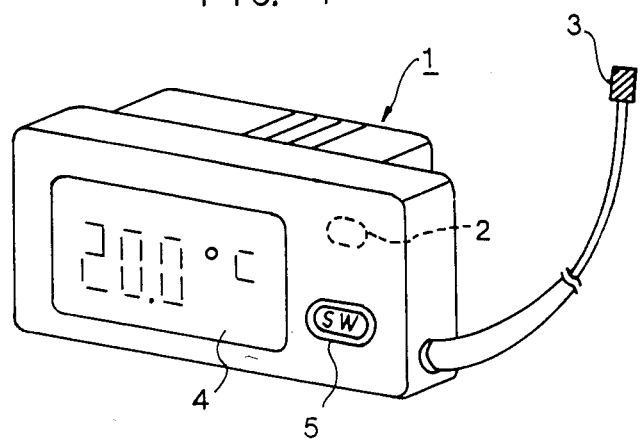
FIG. 1 is a schematic perspective view showing an electronic thermometer apparatus according to an exemplary embodiment of the present invention.

Now, the invention will be described in conjunction with exemplary embodiments thereof by referring to the drawings.

Figure 2:
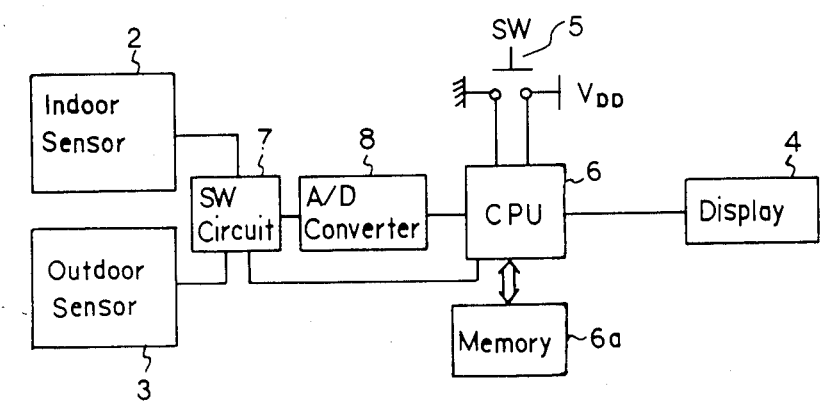
FIG. 2 is a block diagram showing a general arrangement of the same.

FIG. 1 is a pictorial view showing schematically an outer appearance of an electronic thermometer apparatus according to an embodiment of the invention, and FIG. 2 is a block diagram showing a general circuit arrangement of the same. Referring to FIGS. 1 and 2, the electronic thermometer apparatus generally denoted by a reference numeral 1 includes a first temperature sensor 2 and a second temperature sensor 3. For convenience of description, it is assumed that the first temperature sensor 2 serves for the detection of the indoor temperature while the second sensor 2 serves as the outdoor temperature sensor. Accordingly, the sensor 2 is mounted on the main body or console of the thermometer apparatus 1 with the sensor 3 being connected thereto through a cable. It should however be understood that the invention is not restricted to the application of measurement of the indoor and outdoor temperatures. In more general sense, the sensor 2 may be employed for the detection of temperature in a first region while the sensor 3 is used for monitoring the temperature in a second region which differs from the first region.

Turning back to FIGS. 1 and 2, a numeral 4 denotes a digital display unit for displaying temperatures, and 5 denotes a change-over switch. In FIG. 2, a reference numeral 6 denotes a microcomputer (hereinafter referred to as CPU in abbreviation), 7 denotes a switching or gate circuit and a numeral 8 denotes an analogue-to-digital (A/D) converter, all of which are installed within the console or main body of the thermometer apparatus 1.

Temperature information derived from the first sensor or indoor sensor 2 and the second sensor or outdoor sensor 3 is alternately gated through the switch circuit 7 and supplied to the A/D converter 8 to be converted to corresponding digital temperature information. The digital temperature information is alternately displayed on the display unit or field 4 by way of the CPU. This alternate display of the indoor and outdoor temperatures may be referred to as the normal display mode. When the change-over switch 5 is closed (ON) in the normal display mode, the ON-signal produced thereby is applied to the switch circuit 7 through the CPU 6, as the result of which the currently displayed temperature (i.e. the temperature displayed immediately in precedence to the closing of the change-over switch 5) is changed over to the other temperature. In other words, when the temperature detected by the indoor sensor 2 is currently displayed, the temperature to be displayed upon closing of the change-over switch 5 is the one detected by the outdoor sensor 3. The temperature sensor thus changed over is displayed continuously so long as the switch 5 is maintained in the closed (ON) state. When the switch 5 is again opened (OFF), the normal display mode, i.e. the alternate display of the indoor and outdoor temperature is regained.

Figure 3:
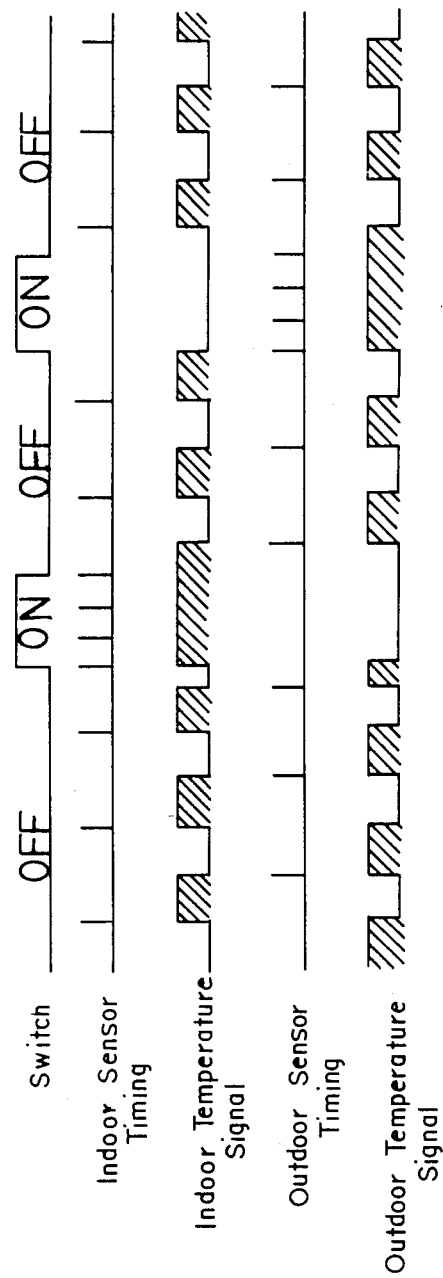
FIG. 3 is a timing chart for illustrating display operation of the thermometer apparatus shown in FIG. 2.

Relationship between ON/OFF operations of the change-over switch 5 and display of the indoor and outdoor temperatures is illustrated in the time chart in FIG. 3, wherein the hatched areas represent the temperature displaying state.

Figure 4:
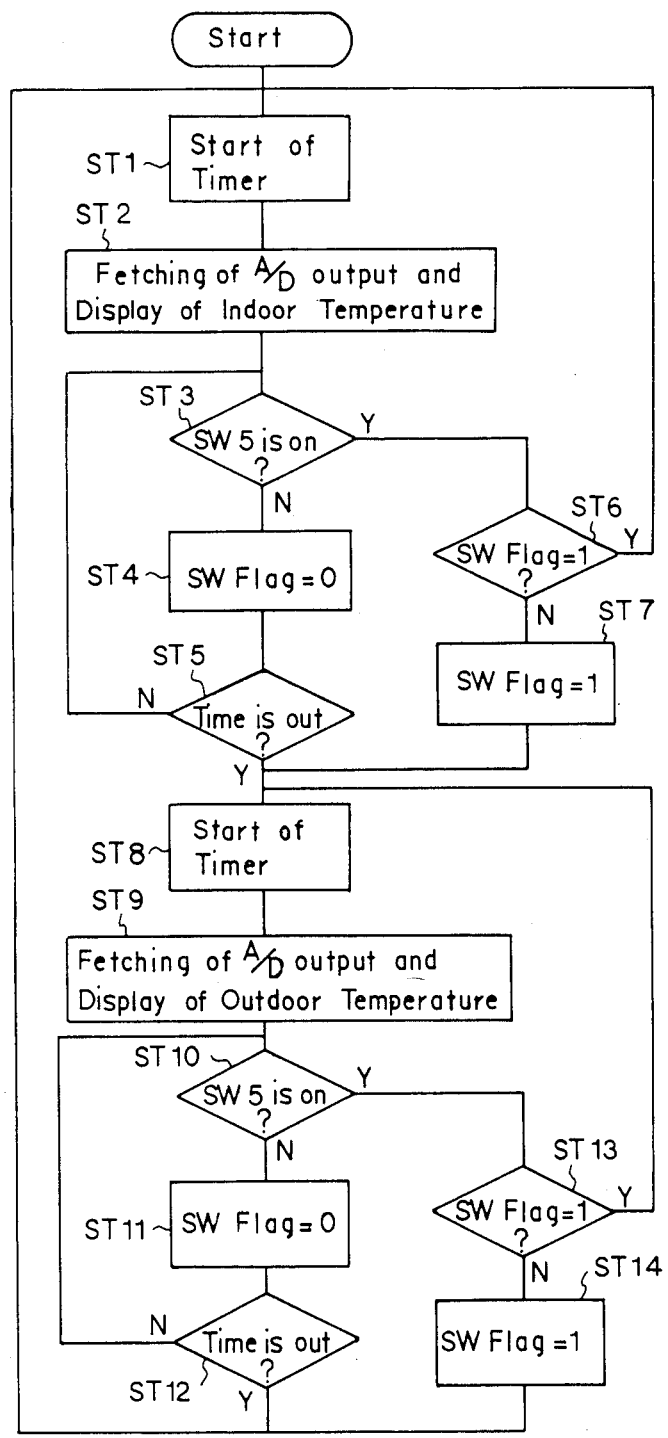
FIG. 4 is a flow chart illustrating operation of the electronic thermometer apparatus shown in FIG. 2.

Next, description will be made on operation of the electronic thermometer apparatus shown in FIGS. 1 and 2 by referring to a flow chart of FIG. 4.

After initialization, counting operation of a timer is started for determining a time interval (e.g. 4 seconds) at which the indoor temperature is measured (ST 1). The temperature information signal produced at the output of the indoor sensor 2 is fed to the A/D converter 8 to be displayed as the indoor temperature on the display device 4 through the CPU 6 (ST 2). Subsequently, decision is made as to whether the change-over switch 5 is in the closed state of ON (ST 3). In case the switch 5 is not ON, a switch flag is reset to "0" (ST 4). At a step ST 5, it is determined whether the time or period determined for the measurement of the indoor temperature has lapsed (TIME OUT). Unless the time is out, the routine returns to the step ST 3. Otherwise, counting operation of a timer is started for determining the time interval (e.g. 4 seconds) at which the outdoor temperature is to be periodically sampled (ST 8). Then, the output signal of the outdoor sensor 3 is displayed as the current outdoor temperature through the A/D converter 8 and the CPU 6 as in the case of the indoor temperature display (ST 9). Unless the change-over switch 5 is closed (ST 10), steps ST 11 and ST 12 are executed. When the time for measurement of the outdoor temperature is out (ST 12), the step ST 1 is regained, whereby the process described above is repeated. In this manner, so long as the change-over switch 5 remains off, the indoor temperature and the outdoor temperature are alternately displayed at respective predetermined time intervals for respective predetermined periods.

It is now assumed that the change-over switch 5 is closed (ON) in the state in which the indoor temperature is displayed (ST 3). In this state, the switch flag is "0" (ST 4). The decision at the step ST 6 results in "NO". Consequently, the switch flag is set to "1" at a step ST 7, being followed by execution of the steps ST 8, St 9 and ST 10. The decision step ST 13 results in "YES", because of the switch flag of "1". Thus, so long as the switch 5 is ON, the routine including the steps ST 8, ST 9, St 10 and ST 13 is executed repeatedly. In other words, the outdoor temperature is continuously displayed on the display unit 4 in place of the indoor temperature so long as the change-over switch 5 is actuated or closed. In this conjunction, it should be noted that the outdoor temperature is sampled at shorter time interval than in the normal alternate display of indoor and outdoor temperature, as can be seen in FIG. 3, with the result that the accuracy of measurement is increased. When the change-over switch 5 is decided as being opened (OFF) at a step 10, the switch flag is reset to "0". Thus, upon lapse of the time for the measurement of the outdoor temperature (ST 12), the steps ST 1 and ST 2 are executed, whereby the indoor temperature is displayed. Thereafter, the normal alternate display of the indoor and outdoor temperatures is performed, so long as the switch 5 remains off.

On the other hand, when the change-over switch 5 is closed (ON) in the course of display of the indoor temperature (ST 10), the decision step ST 13 results in "NO" because of the switch flag being "0" at this time point. At the next step ST 14, the switch flag is set to "1", whereby the routine including the steps ST 1, ST 2, ST 6 and ST 7 is repeatedly executed. In this manner, the display of the outdoor temperature is interrupted and the indoor temperature continues to be displayed so long as the switch 5 is held in the closed state. In this case, the indoor temperature is sampled at the shorter time interval than in the normal alternate display, as will be seen in FIG. 3, whereby the indoor temperature can be displayed at a higher accuracy. When the switch 5 is opened (OFF), the switch flag is reset at the step ST 4, resulting in the normal alternate display mentioned above.

Although the invention has been described in conjunction with the preferred embodiment, the invention will never be restricted thereto. Many modifications and variations will readily occur to those skilled in the art without departing from the spirit and scope of the invention.

What is claimed is:

1. An electronic thermometer apparatus, comprising: a first temperature sensor for monitoring and detecting a first temperature in a first environment; a second temperature sensor for monitoring and detecting a second temperature in a second environment differing from said first environment; a display device for displaying said first and second temperatures on the basis of outputs from said sensors; means for displaying automatically said first and second temperatures in an alternate manner in a normal operating mode; a change-over switch for changing over the alternating display of said first and second temperatures to a continuous display of only one of said first and second temperatures; computer-controlled means responding to activation of said change-over switch to thereby cause the one of said first or second temperatures that is not displayed immediately before the activation of said change-over switch to be displayed continuously until said change-over switch is deactivated; and computer-controlled means responding to the deactivation of said change-over switch to allow said alternate display of said first and second temperatures to be continuously effected.

2. An electronic thermometer apparatus according to claim 1, wherein said first and second temperatures are indoor and outdoor temperatures, respectively.

3. An electronic thermometer apparatus according to claim 1, wherein said first or second temperature displayed in response to the activation of said change-over switch is sampled at a shorter time interval than in said normal operating mode.

* * * * *